Oct. 18, 1966 L. A. HOPKINS 3,279,555
GAS-CUSHION VEHICLES HAVING CUSHION-CONTAINING WALLS
OF FLEXIBLE, INFLATABLE CONSTRUCTION
Filed Nov. 5, 1965 2 Sheets-Sheet 1

INVENTOR
L. A. HOPKINS
BY
Cameron, Kerkam & Sutton
ATTORNEYS

Oct. 18, 1966 L. A. HOPKINS 3,279,555
GAS-CUSHION VEHICLES HAVING CUSHION-CONTAINING WALLS
OF FLEXIBLE, INFLATABLE CONSTRUCTION
Filed Nov. 5, 1965 2 Sheets-Sheet 2
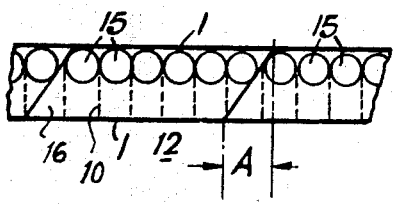
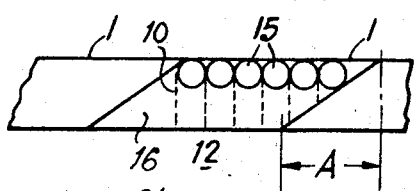
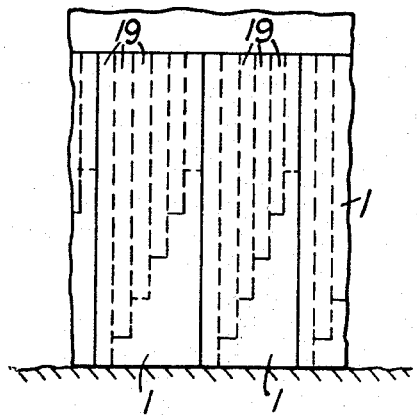
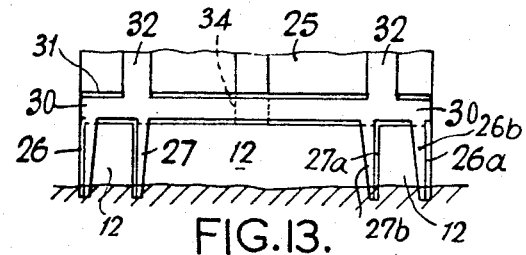
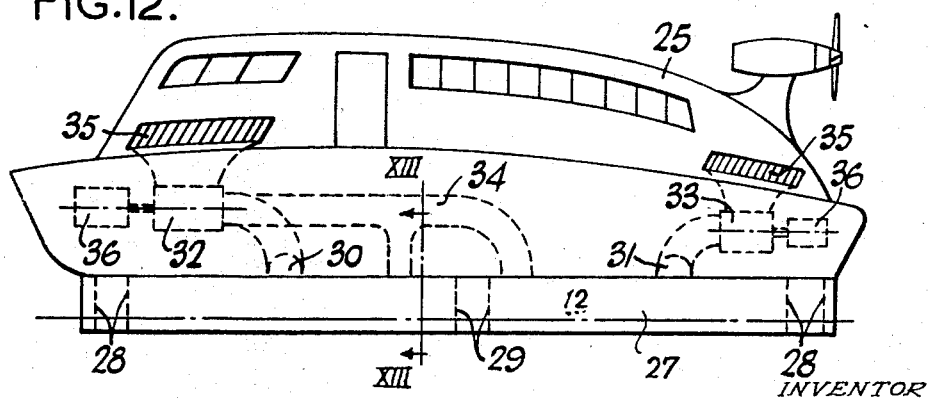
INVENTOR
L. A. HOPKINS
BY
Cameron, Kerkam & Sutton
ATTORNEYS

United States Patent Office 3,279,555
Patented Oct. 18, 1966

3,279,555
GAS-CUSHION VEHICLES HAVING CUSHION-CONTAINING WALLS OF FLEXIBLE, INFLATABLE CONSTRUCTION
Leslie Arthur Hopkins, Hythe, Southampton, England, assignor to Hovercraft Development Limited, London, England, a British company
Filed Nov. 5, 1965, Ser. No. 506,484
Claims priority, application Great Britain, July 30, 1962, 29,265/62
13 Claims. (Cl. 180—7)

This application is a continuation-in-part of application Serial No. 298,162 filed July 29, 1963, now abandoned and relates to gas-cushion vehicles, that is to say, to vehicles for travelling over a surface and which are supported above that surface, at least in part, by a cushion of pressurised gas (usually air) formed and contained beneath the vehicle body.

It has been proposed that the vehicle-supporting cushion should be contained, for at least part of its periphery, by a downwardly extending flexible wall which can be deflected by contact with surface irregularities, such as a wave when the vehicle is travelling over water, or rocks and the like when the vehicle is travelling over land.

According to the invention, in a gas-cushion vehicle wherein the cushion is contained, at least in part, by a flexible wall depending downwardly from the vehicle body, said wall comprises a series of contiguous inflatable wall members provided with internal wall means of flexible material dividing each wall member into separate, downwardly extending compartments, and means for inflating said compartments to differing pressures whereby a gradation of stiffness is provided across each wall member with less stiffness on the cushion side of the longitudinal axis of the wall than on the opposite side thereof.

Figure 2:
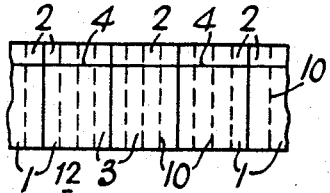
Figure 3:
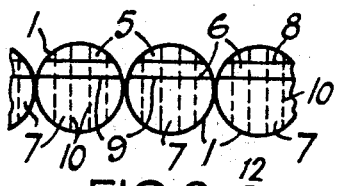
Figure 4:
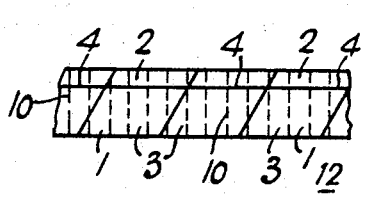
Figure 5:
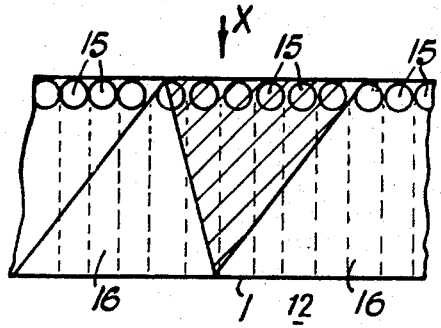
Figure 6:
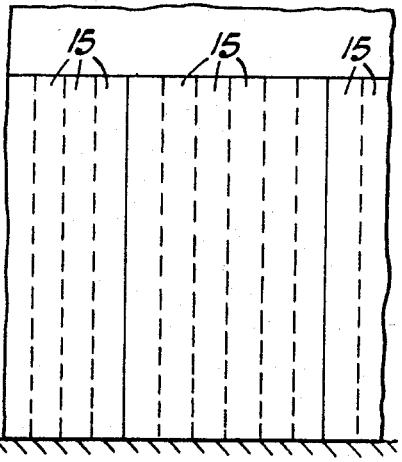
Figure 7:
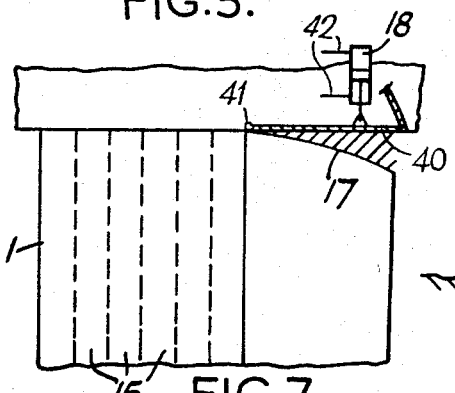

The invention will be readily understood from the following description of certain embodiments, by way of example, in conjunction with the accompanying drawings, in which:

FIGURES 1 to 4 are horizontal cross-sections through a cushion-containing wall illustrating various cross-sections of inflatable wall members, FIGURE 5 is a similar view to that of FIGURE 4, to a larger scale, illustrating a modification thereof, FIGURE 6 is a side view of a further cushion-containing wall, FIGURE 7 is a side view of the top portion of one inflatable wall member, as in FIGURE 5, illustrating a modification thereof, FIGURE 8 is a horizontal cross-section through a cushion-containing wall near the bottom thereof, the inflatable wall members having a cross-section similar to that of FIGURE 5 but being tapered, FIGURE 9 is a cross-section similar to that of FIGURE 8, illustrating a modification thereof, FIGURE 10 is a side view similar to that of FIGURE 6, illustrating the variation of length of the internal tubes, FIGURE 11 is a vertical cross-section, normal to the cushion defining surface, of the bottom portion of an inflatable wall member illustrating a further embodiment, FIGURE 12 is a side view of a gas-cushion vehicle, and FIGURE 13 is a vertical cross-section on the line 13—13 of FIGURE 12.

FIGURES 1 to 4 illustrate various horizontal cross-sections which can be used for air cushion-containing walls in the manner of this invention, each wall comprising a series of contiguous inflatable wall members 1 of .033" thick neoprene-proofed nylon sheet. The wall members are inflated with pressurised air. The pressurised cushion which the walls contain is indicated by reference numeral 12.

Figure 1:
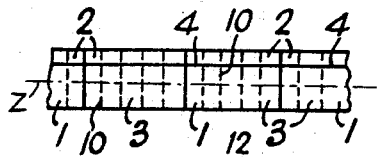

In FIGURE 1 the horizontal cross-section of each inflatable wall member 1 is rectangular, the larger dimension extending in the direction of the length of the wall. The width of the wall is 12" and the length of the wall member is 36". In FIGURE 2 the wall member cross-section is again rectangular, the larger dimension extending normal to the direction of the length of the wall. Each inflatable wall member 1 is divided internally into two downwardly extending compartments 2 and 3 by wall means in the form of a flexible diaphragm 4. In FIGURE 3 inflatable wall members 1 are in the form of circular tubes and in this example each wall member 1 is divided internally into three downwardly extending compartments 5, 6 and 7 by flexible diaphragms 8 and 9, the diaphragms 4, 8, 9 are of the same material as the remainder of the wall members. The compartments 5, 6 are disposed in tandem along an imaginary axis disposed substantially normal to the cushion periphery with the compartment 6 on the side of the longitudinal axis Z (FIGURE 1 only) of the wall remote from the cushion 12. FIGURE 4 illustrates inflated wall members 1 having a rhomboid cross-section, the members being divided into two compartments 2 and 3 by diaphragms 4 as in FIGURES 1 and 2. All of the walls illustrated have a height of 36".

For a cushion pressure of 30 lb. per square foot, the compartments 2 in FIGURES 1, 2 and 4 and compartments 6 in FIGURE 3 are inflatable by means for example, as described hereinafter with reference to FIGURES 12 and 13, to a pressure of about 400 lb. per square foot and the other compartments 3, 5 and 7 to a pressure of about 45 lb. per square foot. This provides a relatively stiff backbone for each inflatable wall member 1 which withstands the pressure differential of the air cushion 12 acting across the wall, but at the same time provides a structure which will deflect over obstacles. The pressures in the compartments 3, 5 and 7, being lower than those in the compartments 2 and 6, serve to provide a return loading tending to keep the wall members erect, forming, in effect, a low-rate spring. The described distribution of the compartments with respect to the horizontal cross-section of a wall member provides a gradation of stiffness across a wall member with less stiffness on the cushion side of the longitudinal axis Z of the wall than on the opposite side thereof.

The wall member compartments may be permanently inflated in the manner of a football bladder or they may be "continuously" inflated from a source on the vehicle, for example being inflated only when the vehicle is operating. Permanently inflated wall member compartments have a disadvantage in that if a compartment is damaged the wall member may become deflated. However, if a wall member is provided with a large number of relatively small internal compartments, this disadvantage may not be of great importance. Being separate, the wall members 1 can deflect individually, relative to each other, when in contact with surface irregularities.

If only the compartments 2 and 6 were provided, without the compartments 3, 5 and 7, the condition could arise in which the compartments 2 and 6 would tend to kick or bend and the compartments could then collapse fairly rapidly with very little further increase in the load applied. The provision of the low pressure compartments can reduce or even prevent such collapse.

For walls which extend lengthwise of a vehicle, the deflection is usually rearwards whilst the cushion pressure acts in a direction normal to this deflection. A rhomboidal (horizontal) cross-section provides an inflatable wall member having a more efficient return action after rearward deflection than a square, rectangular or circular (horizontal) cross-section of the same cross-sectional area, as its axis in the direction parallel to the fore and aft direction is greater than its axis normal to this direction. For such a wall, therefore, inflatable wall members with a cross-section as in FIGURE 4 can be lighter for the same strength and efficiency. There is also a self-sealing effect between adjacent wall members due to the cushion pressure.

To maintain the correct cross-section when inflated, constraining or tie cords 10 are provided. Such constraint can be provided in more than one direction and perforated diaphragms can be used instead of tie cords.

FIGURE 5 is a horizontal cross-section of air-inflatable wall members 1 having a rhomboidal cross-section, as in FIGURE 4, in which an alternative method of dividing up the interior of a wall member 1 is used. In this example, a row of air-inflatable tubes 15 (of the same or similar material as the remainder of the wall member 1) comprise the internal wall means dividing the interior of the wall member into separate, downwardly extending compartments, the tubes depending from the top surface of the member 1. The tubes 15 are inflated to a pressure which is higher than that in the compartment 16 forming the remainder of the member 1, the ratios of cushion pressure, pressure of compartment 16 and compartments 15 being 1:1.5:13.3. The tubes 15 are disposed vertically in tandem across the member 1 and along an imaginary axis disposed substantially parallel to the periphery of the cushion 12. The tubes 15 depend from the top surface of the member 1 to the bottom thereof, as seen in FIGURE 6 which is a side view of the example illustrated in FIGURE 5.

The use of a rhomboidal, horizontal cross-section also enables a variation in the return action to be provided. FIGURE 7 is a side view of a single inflatable wall member 1 as illustrated in FIGURE 5, the side view being in the direction of the arrow X in FIGURE 5. Thus, for example, if only the cross-hatched area in FIGURE 5 is attached to the bottom surface of the vehicle body, the remaining part 17 of the upper surface of the inflatable member 1 can be shaped so as to be clear of said bottom surface, as seen in FIGURE 7, when the inflatable wall member is in its undeflected position. As the wall member is deflected, to the right in FIGURE 7, then the part 17 of the top surface thereof will progressively come into contact with the bottom surface of the vehicle body, giving a progressively increasing return action. The shape of the part 17 of the wall member top surface can be made to suit requirements.

A further variation in return action can be obtained by providing a movable member which can be inserted between the part 17 of the wall member top surface and the bottom surface of the vehicle body, or by providing means for deflecting a part of said bottom surface downwards. It will be appreciated that with the construction illustrated in FIGURE 7, the resistance to deflection is least in the position shown, the resistance increasing as the top surface 17 progressively comes into contact with the bottom surface of the vehicle body. As the resistance to deflection increases so will also the return action, when deflected.

If, as illustrated in FIGURE 7, a part 40 of the bottom surface of the vehicle body is hinged thereto at 41 and is deflected down into contact with the wall member top surface 17, as by actuating means in the form of, a hydraulic jack 18 under the control, through hydraulic signal lines 42, of the pilot of the vehicle, the resistance to deflection can be varied. Thus the effect of a "soft" ride or a "hard" ride can be obtained according to the operating conditions of the vehicle.

The inflatable wall members 1 need not be the same thickness from top to bottom. The thickness at the top is governed by the resistance to deflection and by the return action which is required. This same thickness may not be necessary at the bottom and the inflatable wall members can then taper from top to bottom. However, if the use of a rhomboidal horizontal cross-section provides the sealing between side parts of immediately adjacent wall members by means of the overlap, this overlap is reduced as the wall members taper. This is illustrated in FIGURE 8, which is a horizontal cross-section near the bottom of a group of inflatable wall members 1. It will be seen that the overlap A is much less than the overlap which occurs at the top of the wall members as in FIGURE 5.

The reduced overlap may allow excessive leakage of cushion forming gas, particularly when the wall members 1 are deflected. The reduction of overlap can be avoided, at least to some extent, by varying the horizontal cross-section of the wall members 1 to sharpen the angle of the rhomboid. This is illustrated in FIGURE 9 where, by varying the cross-section, the overlap A, whilst still less than at the top, is more than in FIGURE 8. By suitable variation of the cross-section, the overlap can be maintained constant for the full length of the wall members.

Depending upon the distribution of loads on the wall members 1, so can the stiffness provided by the separate compartments which are inflated at the higher pressure also be so distributed. In FIGURE 10 there is illustrated an arrangement in which a row of internal, vertically-disposed, tubes 19, similar to the tubes 15 in FIGURE 6, are varied in length progressively across the wall members 1, i.e. along the imaginary axis disposed substantially parallel to the periphery of the cushion 12. The lengths of the tubes 19 can be varied in other arrangements, and where the internal compartments are formed by wall means other than tubes, then the lateral stiffness of a wall member can be varied by varying the distribution and/or length of the compartments cross-sectional areas of the compartments, and also by varying the inflation pressures thereof. Such variations in the dimensions, distribution and inflation pressures of the wall member compartments enables considerable variation to be obtained in the stiffness of the wall members in one or more directions.

The inflatable wall members can also be used where it is desired to form cushion-containing fluid curtains from the bottoms of the walls. Such an arrangement is illustrated in FIGURE 11 which is vertical cross-section of the bottom part of a wall member. The interior of the wall member 1 is divided, by a flexible diaphragm 43 into two compartments 20 and 21, compartment 20 being inflated to a pressure higher than that of the compartment 21, in a manner similar to that explained hereinafter in respect of the example illustrated in FIGURES 12 and 13. These compartments can be formed by a flexible diaphragm as in FIGURES 1 to 4 or by flexible tubes as in FIGURE 5. A supply port 22 is formed in the bottom of the compartment 20 and part of the pressurised air which inflates compartment 20 issues through the supply port 22 to form an air curtain 23, cooperating with the wall member 1 in containing the cushion 12. Alternatively, or in addition, a supply port can be formed in the bottom of the compartment 21 for the formation of a further air curtain. A pressure differential between the compartments 20, 21 can still be achieved by adjustment of the inflation air supply.

Inflatable wall members can be used to form flexible walls for any part of the periphery of a cushion. Walls formed by the wall members can be provided along the sides of a gas-cushion vehicle, across the front of a vehicle and/or across the rear of a vehicle. They can also extend parallel to the fore and aft axis of the vehicle and/or normal to this axis at positions other than at the edges of the vehicle. FIGURES 12 and 13 illustrate an air-screw propelled gas-cushion vehicle 25 having pairs of parallel-disposed walls 26 and 27 disposed in spaced array along the sides of the vehicle body to divide the vehicle-supporting air cushion 12 into one inboard and two outboard cushion portions. The walls 26, 27 are divided internally by flexible diaphragms into separate, downwardly extending compartments 26a, 26b, 27a, 27b with the outboard compartments 26a, 27a, inflatable to pressures higher than those existing in the inboard compartments 26b, 27b, so that the walls 26, 27 are stiffened locally on the outboard sides of their longitudinal axes. The gap between the ends of the walls 26 and 27 can be filled by any suitable form of flexible wall member, for example, a wall member of FIGURE 2, indicated in FIGURE 12 by the dotted lines 28. A further flexible wall member 29 can be positioned across the vehicle at some intermediate position to form separated fore and aft cushion portions which improve pitch stability of the vehicle.

Compressed air is supplied to the various wall member compartments through ducts 30 and 31. The ducts 30 and 31 are fed from variable-output air compressors 32 and 33, respectively, compressor 32 supplying relatively low pressure air through the duct 30 to compartments 26b, 27b, compressor 33 supplying relatively high pressure air through the duct 31 to compartments 26a, 27a. It will be appreciated that in the particular example illustrated, where no curtains of fluid are formed from the bottoms of the walls, then once the wall member compartments have been inflated the air requirements are very low, being only that to make up any leakage. Once the wall member compartments have been inflated, air from, for example compressor 32, can be fed through three branch ducts 34 to form the three portions of the cushion 12. Each branch duct 34 is bifurcated to feed the fore and aft parts of the cushion portions. The compressors 32 and 33 draw in atmospheric air through intakes 35 and are driven by engines 36.

Roll stability of the vehicle can be improved by means (e.g. air flow control valves in the ducts 34) to vary the pressures of the inboard and outboard cushion portions. The relative positioning of the internal wall means can be varied within a wall member as can also the various inflation pressures. The inflation pressures can also be varied during operation of the vehicle, for example, by adjustment of the compressors 32, 33, so as to vary the stiffness of the wall members during operation, in addition to the variation of the relative pressures to vary the distribution of the stiffness.

To ensure satisfactory sealing particularly where the cross-sections of wall members do not provide an overlap, flexible seals may be provided between adjacent inflatable members. If desired, lifting members such as hydrofoils, planing surfaces, skids or wheels may be provided at the bottoms of the wall members.

I claim:

1. A gas-cushion vehicle wherein the cushion periphery is contained, at least in part, by a flexible wall depending downwardly from the vehicle body, said wall comprising a series of separate, contiguous inflatable wall members disposed along the longitudinal axis of said wall and individually deflectable relative to each other, internal wall means of flexible material dividing each wall member into at least two separate, downwardly extending compartments disposed one behind the other along an axis extending substantially normal to the cushion periphery, and means for inflating the wall member compartment nearest the cushion to a relatively low pressure and for inflating the remaining wall member compartments to a relatively high pressure, whereby a gradation of stiffness is provided across each wall member with less stiffness on the cushion side of the longitudinal axis of the wall than on the opposite side thereof.

2. A vehicle as claimed in claim 1 wherein the compartments of each wall member include a row of vertically extending flexible tubes disposed within said wall member substantially parallel to the cushion periphery.

3. A vehicle as claimed in claim 2 wherein each successive tube in the row extends for a progressively shorter distance down the interior of said wall member.

4. A vehicle as claimed in claim 1 wherein said wall members are of substantially circular, horizontal cross-section.

5. A vehicle as claimed in claim 1 wherein said wall members are of substantially rectangular, horizontal cross-section.

6. A vehicle as claimed in claim 1 wherein said wall members are of substantially rhomboidal, horizontal cross-section and are disposed so that the side parts of immediately adjacent wall members overlap each other.

7. A vehicle as claimed in claim 1 wherein each wall member is attached to the bottom of the vehicle body over a part of the member's upper surface, the remainder of said upper surface being relieved so as to engage progressively with the vehicle body should the wall member be deflected, whereby the resistance to deflection increases progressively.

8. A vehicle as claimed in claim 7 including actuating means for engaging the relieved portions of the wall members, whereby resistance to deflection is varied.

9. A vehicle as claimed in claim 1 wherein at least one of the wall member compartments has an open lower end from which inflation fluid issues to form a curtain which co-operates with the wall members in containing the cushion.

10. A vehicle as claimed in claim 1 wherein a pair of side walls are disposed in spaced array along the sides of the vehicle body and means are provided for closing off the gaps between the ends of said walls.

11. A vehicle as claimed in claim 10 provided with a further pair of walls disposed in spaced array substantially parallel to and within the confines of said first mentioned walls, to divide the cushion into one inboard and two outboard cushion portions, said further walls being disposed so that their lateral stiffening occurs adjacent the outboard cushion portions and means for subjecting said inboard and outboard cushion portions to differing pressures.

12. A vehicle as claimed in claim 10 wherein said means for closing off said gaps comprise flexible walls as recited in claim 1.

13. A gas-cushion vehicle wherein the cushion is contained, at least in part, by a flexible wall depending downwardly from the vehicle body, said wall comprising a series of separate, contiguous inflatable wall members disposed along the longitudinal axis of said wall and individually deflectable relative to each other, internal wall means of flexible material dividing each wall member into at least two groups of separate, downwardly extending inflatable compartments, the wall compartments of one group being disposed behind the wall compartments of the other group along an axis extending substantially normal to the cushion periphery, with the wall compartments of the group furthest from the cushion also disposed in tandem along an axis disposed substantially parallel to the cushion periphery, the wall compartments of the latter group varying in length progressively along said last-named axis, and means for inflating the wall member compartments of the group nearest the cushion to a relatively low pressure and for inflating the wall member compartments of the group furthest from the cushion to a relatively high pressure, whereby a gradation of stiffness is provided across each wall member with less stiffness on the cushion side of the longitudinal axis of the wall than on the opposite side thereof.

References Cited by the Examiner

UNITED STATES PATENTS 3,182,740   6/1965   Cockerell _____ 180—7

BENJAMIN HERSH, *Primary Examiner.*

M. S. SALES, *Assistant Examiner.*